United States Patent
Wakita et al.

(10) Patent No.: US 11,448,838 B2
(45) Date of Patent: Sep. 20, 2022

(54) OPTICAL COMPONENT AND METHOD FOR MANUFACTURING SAME

(71) Applicant: Nippon Telegraph and Telephone Corporation, Tokyo (JP)

(72) Inventors: Hitoshi Wakita, Tokyo (JP); Kota Shikama, Tokyo (JP); Yuta Ueda, Tokyo (JP); Hiroyuki Ishii, Tokyo (JP); Takushi Kazama, Tokyo (JP); Koji Takeda, Tokyo (JP); Shigeru Kanazawa, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 31 days.

(21) Appl. No.: 17/255,594

(22) PCT Filed: Jun. 7, 2019

(86) PCT No.: PCT/JP2019/022708
§ 371 (c)(1),
(2) Date: Dec. 23, 2020

(87) PCT Pub. No.: WO2020/003973
PCT Pub. Date: Jan. 2, 2020

(65) Prior Publication Data
US 2021/0215893 A1 Jul. 15, 2021

(30) Foreign Application Priority Data
Jun. 28, 2018 (JP) .............................. JP2018-122721

(51) Int. Cl.
*G02B 6/42* (2006.01)

(52) U.S. Cl.
CPC .......... *G02B 6/4212* (2013.01); *G02B 6/4244* (2013.01); *G02B 6/4245* (2013.01); *G02B 6/4255* (2013.01)

(58) Field of Classification Search
CPC ....................................................... G02B 6/43
See application file for complete search history.

(56) References Cited

U.S. PATENT DOCUMENTS

| 4,362,360 A | 12/1982 | Mannschke |
| 6,530,698 B1 | 3/2003 | Kuhara et al. |

(Continued)

FOREIGN PATENT DOCUMENTS

| JP | S54124749 | 9/1979 |
| JP | H09127376 A | 5/1997 |

(Continued)

OTHER PUBLICATIONS

Suzuki et al., "Cost-Effective Optical Sub-Assembly Using Lens-Integrated Surface-Emitting Laser," Journal of Lightwave Technology, vol. 34, No. 2, Jan. 15, 2016, pp. 358-364.

*Primary Examiner* — John Bedtelyon
(74) *Attorney, Agent, or Firm* — Slater Matsil, LLP (57) ABSTRACT

There is provided an optical element mounted on a substrate and an optical coupling element mounted on the substrate. The optical coupling element includes a guide unit extending in a direction parallel to a plane of the substrate so as to fix an optical fiber. There is provided a mold resin layer formed on the substrate so as to cover the optical element and expose a side surface of the optical coupling element at one end of the guide unit. The optical element includes a light incidence/emission unit on a side surface perpendicular to the plane of the substrate, and the other end of the guide unit and the light incidence/emission unit are disposed to face each other.

11 Claims, 8 Drawing Sheets

(56) References Cited

U.S. PATENT DOCUMENTS

| | | | |
|---|---|---|---|
| 8,721,192 | B2 | 5/2014 | Miyadera et al. |
| 10,541,234 | B2 * | 1/2020 | Furuyama ............ G02B 6/4214 |

FOREIGN PATENT DOCUMENTS

| JP | H11154772 A | 6/1999 |
|---|---|---|
| JP | 2001021775 A | 1/2001 |
| JP | 2007271790 A | 10/2007 |
| JP | 200912245 A | 6/2009 |
| JP | 2015210306 A | 11/2015 |

* cited by examiner

OPTICAL COMPONENT AND METHOD FOR MANUFACTURING SAME

CROSS-REFERENCE TO RELATED APPLICATIONS

This application is a national phase entry of PCT Application No. PCT/JP2019/022708, filed on Jun. 7, 2019, which claims priority to Japanese Application No. 2018-122721, filed on Jun. 28, 2018, which applications are hereby incorporated herein by reference.

TECHNICAL FIELD

The present invention relates to an optical component including an optical element and an optical coupling element formed on the same substrate, and a method for manufacturing the optical component.

BACKGROUND

Figure 12A:
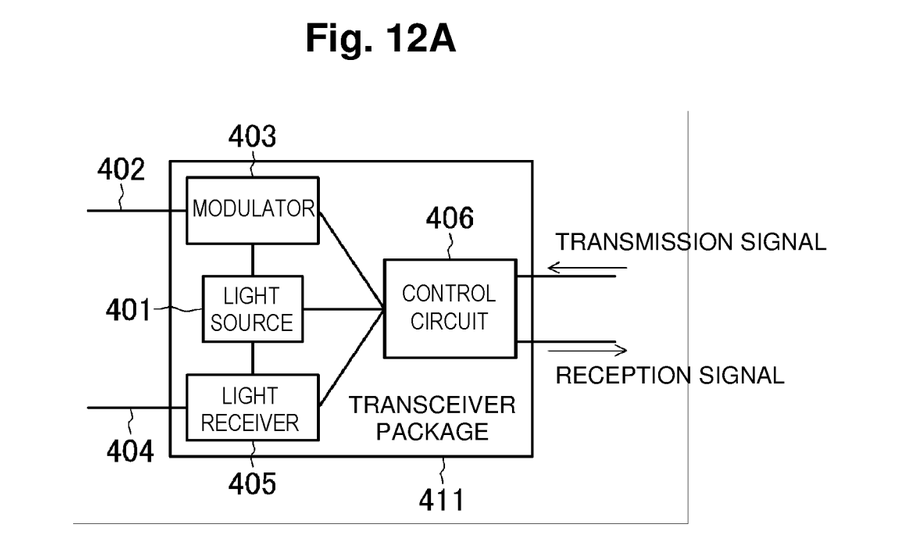
FIG. 12A is a configuration view showing a configuration of an optical transceiver.

Optical communication uses, for example, an optical transceiver. As shown in FIG. 12A, the optical transceiver includes a light source 401, a modulator 403 to which a transmission optical fiber 402 is connected, a light receiver 405 to which a reception optical fiber 404 is connected, a control circuit 406 that controls these, and components such as electric circuits (not shown) relating to these. Furthermore, a group of these components is integrated, mounted, and packaged in a transceiver package 411 having a certain form factor represented by the CFP standard or the like.

Figure 12B:
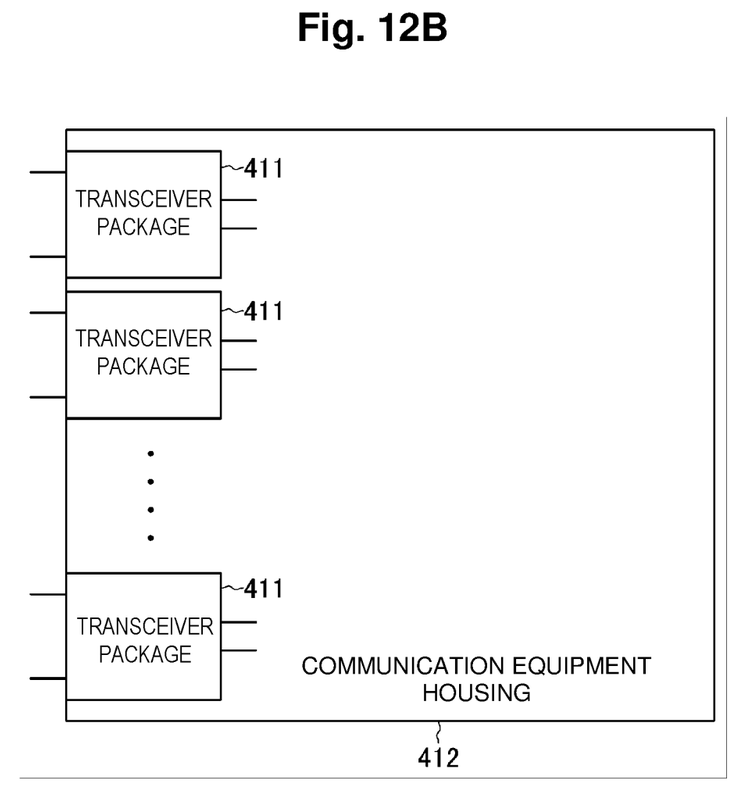
FIG. 12B is a configuration view showing a configuration of communication equipment including the optical transceiver.

Furthermore, as shown in FIG. 12B, a plurality of the transceiver packages 411 is, as a front end of an optical communication apparatus, accommodated in a communication equipment housing 412 and used. This configuration allows, according to a failure or obsolescence of the optical transceiver, the relevant transceiver package 411 to be taken out of the communication equipment housing 412 and easily replaced with a new optical transceiver.

Figure 13:
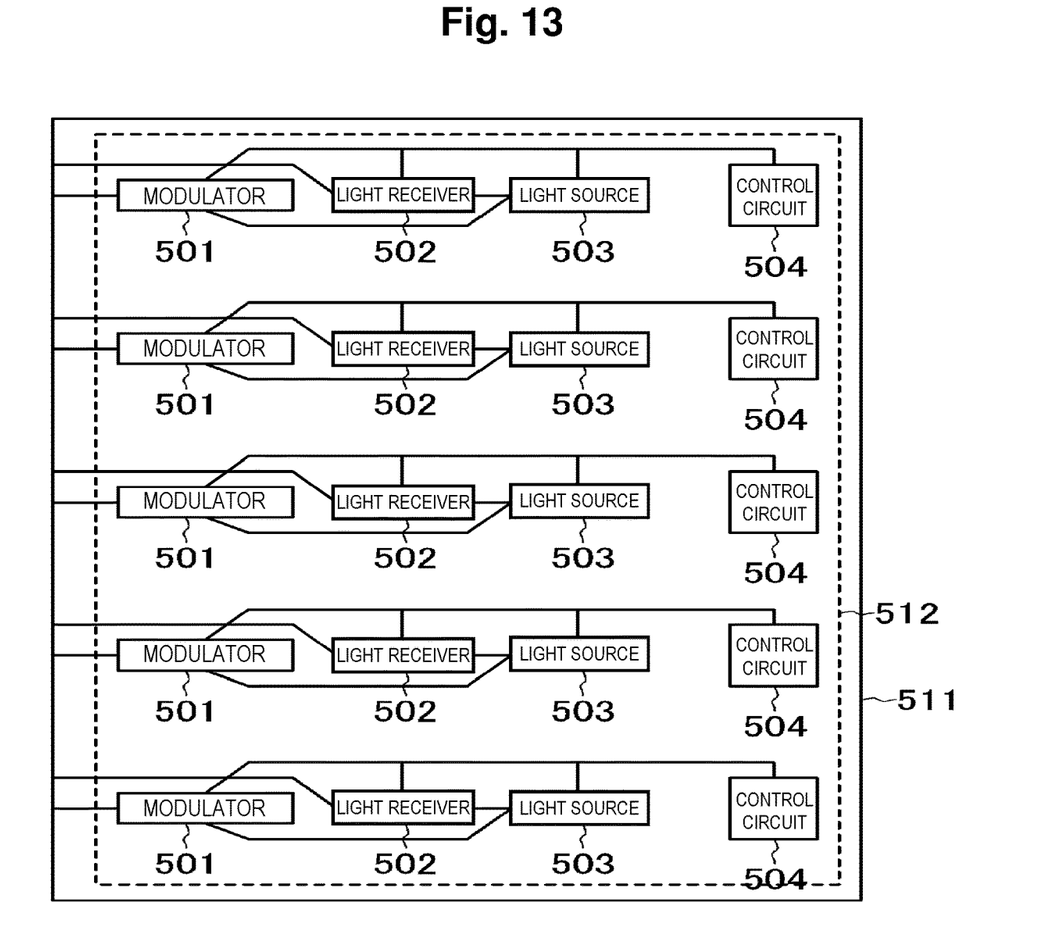
FIG. 13 is a configuration view showing a configuration of communication equipment in an on-board optics mounting form.

On the other hand, there is also a mounting form called on-board optics (OBO). In this mounting form, as shown in FIG. 13, each of components such as a modulator 501, a light receiver 502, a light source 503, and a control circuit 504 is not packaged and is mounted on a printed circuit board 512 in a communication equipment housing 511.

The OBO is advantageous in reducing the number of components and the mounting cost associated with packaging of the optical components, allowing an expectation for cost reduction of communication equipment. Furthermore, no use of an optical transceiver as a package means that the optical components are not attached and detached, eliminating the need for one-dimensionally mounting the optical components on an edge of the board. The OBO allows the optical components to be two-dimensionally disposed at any locations on the board. This can consequently contribute to downsizing of communication equipment due to an improved mounting density of the components and also low power consumption of communication equipment due to heat management of the communication equipment through measures for disposition of the optical components.

In achieving the cost reduction that motivates the use of the OBO, it is important for each of the optical components to have a planar interface such as a ball grid array (BGA), as the optical components are attached to the board. Furthermore, it is important for these components to be able to withstand heat at the reflow step (reflowable). In addition, it is also important for the self-alignment effect of the reflow step to work with high accuracy, from the viewpoint of reducing the component mounting accuracy. Furthermore, as well as achieving low-cost electrical coupling between the optical components and the board by using the BGA, achieving low-cost optical coupling between the optical components and the board is further required.

Figure 14:
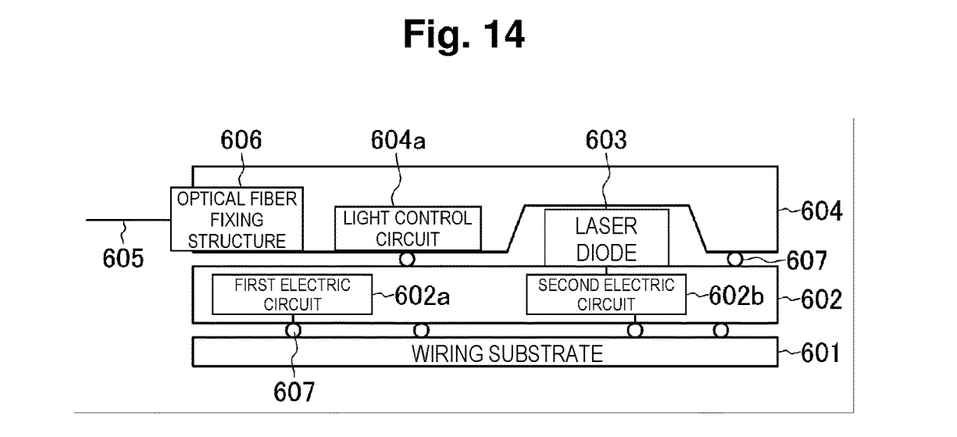
FIG. 14 is a configuration view showing a configuration example of WLP.

In achieving the OBO having the technical requirements described above, a wafer level package (WLP) for packaging the optical components at the chip level is often used. In a conventional WLP structure, for example, a circuit module 602 is mounted on a wiring substrate 601, and in the circuit module 602, a first electric circuit 602a, a second electric circuit 602b, and the like are molded with resin, as shown in FIG. 14. Furthermore, a laser diode 603 is mounted on the circuit module 602. Furthermore, an optical circuit chip 604 including a light control circuit 604a such as a modulator is superimposed on the circuit module 602 so as to cover the laser diode 603. The wiring substrate 601 and the circuit module 602 are connected to each other, and the circuit module 602 and the optical circuit chip 604 are connected to each other, by means of, for example, a BGA 607.

In the optical circuit chip 604, the light control circuit 604a is also molded with an appropriate molding material such as resin. Furthermore, an optical fiber 605 is fixed to the optical circuit chip 604 by an optical fiber fixing structure 606 with molding and optically coupled with the light control circuit 604a.

However, the technique described above has a structure in which an optical fiber or a fiber block for introducing an optical fiber is mounted to a separate WLP, which is not a low-cost optical mounting form. In addition, the optical fiber or the fiber block is introduced in the subsequent step, which thus does not allow the mounting tolerance to be neglected in forming optical coupling with an optical element.

CITATION LIST

Non-Patent Literature

Non-Patent Literature 1: T. Suzuki et al., "Cost-Effective Optical Sub-Assembly Using Lens-Integrated Surface-Emitting Laser," Journal of Lightwave Technology, vol. 34, no. 2, pp. 358-364, 2016.

SUMMARY

Technical Problem

In the conventional technique described above, an optical device that allows light to be incident and emitted at an end surface thereof as described with reference to FIG. 14, for example, directly butt-couples with an optical fiber to be optically coupled therewith at the end surface. Furthermore, the end surface where light is incident and emitted is connected to a fiber receptacle structure to be optically coupled with an end surface of the receptacle by insertion of a fiber array. Furthermore, a spatial optical system is used as in an optical communication front end, and optical coupling is made by means of a lens (see Non-Patent Literature 1).

However, the conventional optical fiber connection technique described above requires the optical mounting to be separately implemented and thus has a problem of increasing the mounting cost. Furthermore, the conventional optical fiber connection technique described above is unable to use a process apparatus used in the WLP and thus also has difficulty in achieving mounting with high accuracy.

Embodiments of the present invention have been made to solve problems as described above, and an object thereof is to enable a mounting form of an optical component for OBO by means of WLP to achieve highly accurate optical coupling with an optical fiber without an increase in the mounting cost.

Means for Solving the Problem

An optical component according to embodiments of the present invention includes an optical element mounted on a substrate, in which the optical element includes a light incidence/emission unit on a side surface perpendicular to a plane of the substrate; an optical coupling element mounted on the substrate, in which the optical coupling element includes a guide unit extending in a direction parallel to the plane of the substrate so as to fix an optical fiber; and a mold resin layer formed on the substrate so as to cover the optical element and expose a side surface of the optical coupling element at one end of the guide unit, wherein the other end of the guide unit and the light incidence/emission unit of the optical element are disposed to face each other.

In the optical component, the optical element includes a plurality of the light incidence/emission units, and a plurality of the optical coupling elements is provided corresponding to each of the light incidence/emission units.

The optical component includes a concave unit provided at a location on the substrate where the optical coupling element is disposed, in which a lower portion of the optical coupling element fits the concave unit, wherein the optical coupling element is disposed to fit the concave unit.

The optical component may include a refractive index matching resin disposed so as to fill between the other end of the guide unit and the light incidence/emission unit of the optical element.

In the optical component, the optical coupling element may include a plurality of the guide units, the optical element may include a plurality of the light incidence/emission units, and each of the light incidence/emission units may be disposed corresponding to each of the guide units.

In the optical component, the optical coupling element may include a lens disposed on an axis of the guide unit.

In the optical component, the guide unit of the optical coupling element may include a small diameter portion on the other end side and a large diameter portion on the one end side, in which the large diameter portion has a larger diameter than the small diameter portion, and the optical component may include an optical fiber disposed from the small diameter portion to the large diameter portion.

A method for manufacturing an optical component according to embodiments of the present invention includes a first step of mounting an optical coupling component on a substrate, in which the optical coupling component includes a guide unit and in which the guide unit extends in a direction parallel to a plane of the substrate so as to fix an optical fiber; a second step of mounting two optical elements on the substrate so that each of open ends of the guide unit and a light incidence/emission unit of the optical element are disposed to face each other, in which the two optical elements each include the light incidence/emission unit on a side surface perpendicular to the plane of the substrate; a third step of forming a mold resin layer covering the optical component; and a fourth step of cutting the optical coupling component and the substrate along a cutting line perpendicular to an extension direction of the guide unit, thereby dividing the optical coupling component into two optical coupling elements.

Effects of Embodiments of the Invention

As explained above, according to embodiments of the present invention, the other end of the guide unit and the light incidence/emission unit of the optical element are disposed to face each other, and the mold resin layer is formed so as to cover the optical element and expose the side surface of the optical coupling element at the one end of the guide unit. Therefore, an excellent effect can be obtained in which a mounting form of an optical component for OBO by means of WIT can achieve highly accurate optical coupling with an optical fiber without an increase in the mounting cost.

DETAILED DESCRIPTION OF ILLUSTRATIVE EMBODIMENTS

Hereinafter, an optical component according to embodiments of the present invention will be explained.

Embodiment 1

Figure 1:
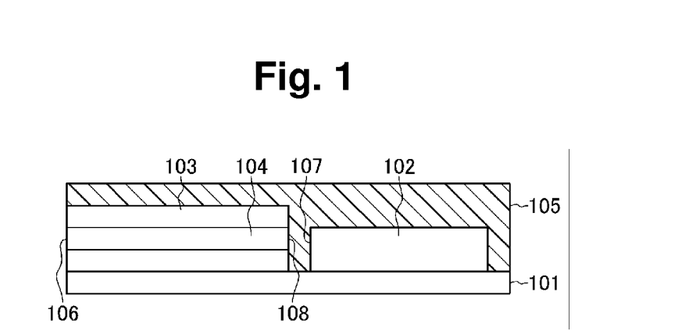
FIG. 1 is a cross-sectional view showing a configuration of an optical component according to Embodiment 1 of the present invention.

First, an optical component according to Embodiment 1 of the present invention will be explained with reference to FIG. 1. This optical component includes an optical element 102 mounted on a substrate 101 and an optical coupling element 103 mounted on the substrate 101. The optical coupling element 103 includes a guide unit 104 extending in a direction parallel to a plane of the substrate 101 so as to fix an optical fiber. In this example, the guide unit 104 is a guide hole into which an optical fiber can be inserted. The optical element 102 is a laser diode or a semiconductor Mach-Zehnder modulator (MZM).

Furthermore, this optical component includes a mold resin layer 105 formed on the substrate 101 so as to cover the optical element 102 and expose a side surface of the optical coupling element 103 at one end 106 of the guide unit 104. Incidentally, the optical element 102 includes a light incidence/emission unit 107 on a side surface perpendicular to the plane of the substrate 101, and the other end 108 of the guide unit 104 and the light incidence/emission unit 107 are disposed to face each other.

The substrate 101 is made of, for example, glass, single crystal silicon, or organic resin. Furthermore, the substrate 101 has, for example, a wiring layer to which each of the elements is connected. The wiring layer may have, for example, a multilayer wiring structure. The optical element 102 is, for example, mounted face up and connected to any of wirings of the wiring layer by a wire or the like. Furthermore, the optical element 102 may be mounted face down and, in this case, is connected to any of the wirings of the wiring layer by flip mounting such as a bump. Furthermore, a penetration wiring penetrating the substrate 101 is used to connect the wiring layer to a terminal such as a BGA by, for example, a solder ball provided on the back surface side.

Figures 2A, 2B:
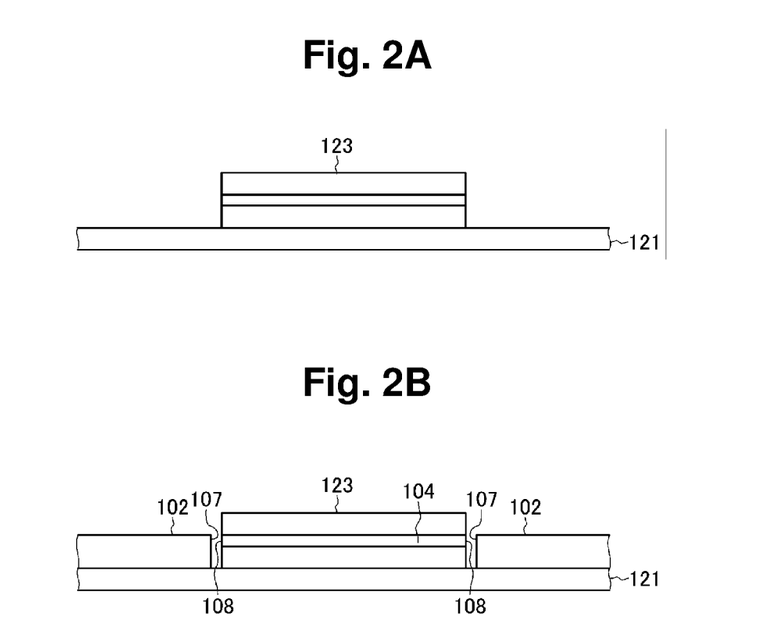
FIG. 2A is a cross-sectional view showing a state of an intermediate step for explaining a method for manufacturing the optical component according to Embodiment 1 of the present invention.
FIG. 2B is a cross-sectional view showing a state of an intermediate step for explaining the method for manufacturing the optical component according to Embodiment 1 of the present invention.

Hereinafter, a method for manufacturing the optical component according to Embodiment 1 described above will be explained with reference to FIGS. 2A to 2D. First, as shown in FIG. 2A, an optical coupling component 123 including the guide unit 104 is mounted on a wafer 121. Incidentally, a predetermined wiring layer (not shown) is formed on the wafer 121, and furthermore a terminal (not shown) such as a BGA is formed on a back surface of the wafer 121. These are connected to each other by a penetration wiring (not shown) penetrating the wafer 121.

Figure 2C:
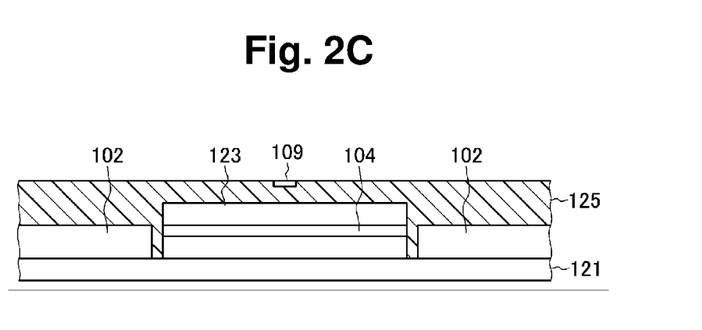
FIG. 2C is a cross-sectional view showing a state of an intermediate step for explaining the method for manufacturing the optical component according to Embodiment 1 of the present invention.

Next, as shown in FIG. 2B, the optical elements 102 are mounted on the wafer 121 so as to hold the optical coupling component 123 therebetween. In this mounting, each of the portions is aligned so that the light incidence/emission unit 107 of the optical element 102 and the other end 108 of the guide unit 104 serving as the guide hole are disposed to face each other. Next, by application of mold resin, a mold resin layer 125 is formed to cover the optical coupling component 123 and the optical element 102 as shown in FIG. 2C.

Furthermore, a cutting line 109 is formed on the mold resin layer 125. For example, the mold resin may be made of a photocurable resin. This mold resin is applied on the wafer 121 on which the optical coupling component 123 and the optical element 102 are mounted and is subjected to low-temperature heating for removing a solvent and the like. Thereafter, a well-known photolithography technique is used to expose a region other than one to be the cutting line 109 and then a predetermined development treatment is performed to form the cutting line 109 that is a concave unit when viewed in cross section. After the development treatment, a curing treatment by heating may be performed.

Figure 2D:
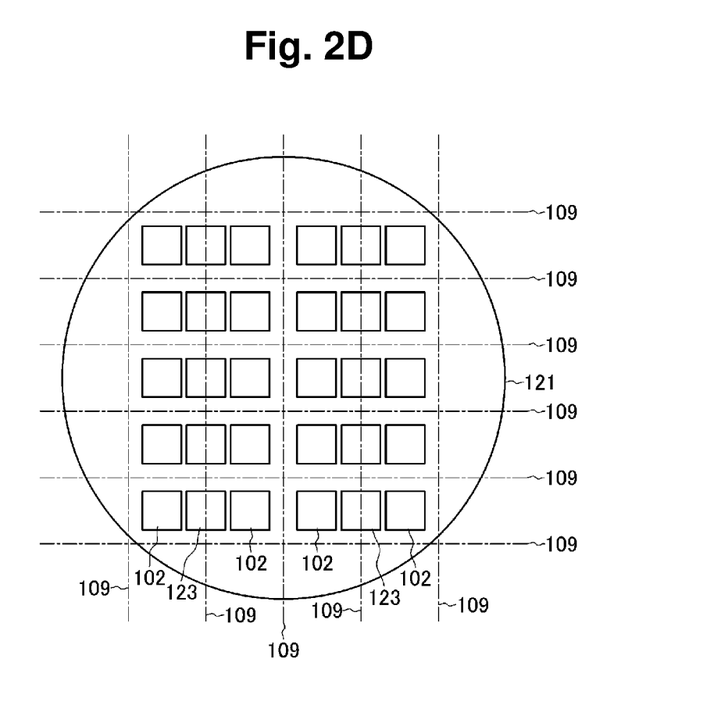
FIG. 2D is a plan view showing a state of an intermediate step for explaining the method for manufacturing the optical component according to Embodiment 1 of the present invention.

On the wafer 121, a plurality of sets of two optical elements 102 disposed to hold the optical coupling component 123 therebetween is provided as shown in FIG. 2D. Incidentally, the mold resin layer is not shown in FIG. 2D. Furthermore, the cutting line 109 is disposed individually between the sets and also at a location passing through the center of the optical coupling component 123 perpendicularly to the extension direction of the guide unit 104 of the optical coupling component 123.

Next, the wafer 121 is cut along the cutting line 109 and divided. Thereby, one optical coupling component 123 is divided into two, each is defined as the optical coupling element 103, and a plurality of the optical components explained with reference to FIG. 1 is produced. In the optical component produced by cutting and dividing the wafer 121, the light incidence/emission unit 107 of the optical element 102 and the other end 108 of the guide unit 104 are already disposed to face each other, which is in a state where each of the positions is aligned (an alignment is established).

Furthermore, the one end 106 of the guide unit 104 is open at a cut surface of the optical coupling element 103 formed by being cut at the cutting line 109, and an optical fiber or a ribbon fiber can be inserted thereinto. When an optical fiber is inserted from the one end 106, optical coupling can be obtained between the light incidence/emission unit 107 of the optical element 102 and the optical fiber. In this way, Embodiment 1 can form a collectively optically mounted optical component.

Embodiment 2

Figure 3A:
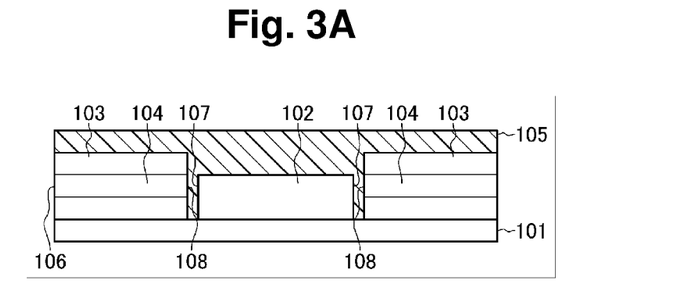
FIG. 3A is a cross-sectional view showing a configuration of an optical component according to Embodiment 2 of the present invention.
Figure 3B:
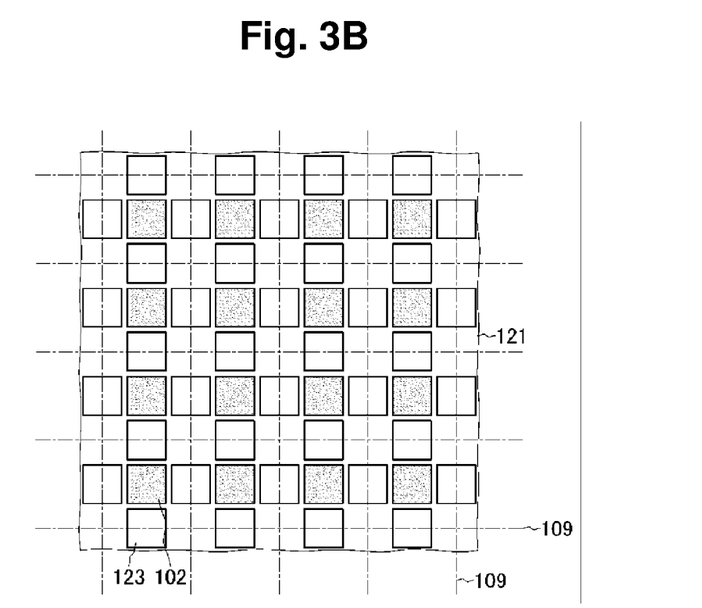
FIG. 3B is a plan view showing a state of an intermediate step for explaining a method for manufacturing the optical component according to Embodiment 2 of the present invention.

Next, an optical component according to Embodiment 2 of the present invention will be explained with reference to FIGS. 3A and 3B. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

In Embodiment 2, the optical element 102 includes a plurality of the light incidence/emission units 107, and a plurality of the optical coupling elements 103 is provided corresponding to each of the light incidence/emission units 107. For example, as shown in FIG. 3B, a plurality of the optical elements 102 formed in a rectangular shape when viewed in plan may be mounted on the wafer 121, in which the optical elements 102 each include a light incidence/emission unit on each side of the rectangular shape, the optical coupling component 123 may be mounted individually between the adjacent optical elements 102, and cutting may be performed along the cutting line 109 indicated by a dot-dash line to provide each of the optical components.

The optical element 102 is, for example, a multi-channel laser diode, a multi-channel photodiode, or, for example, a silicon photonics chip having an integrated optical transmission/reception function. When the optical coupling component 123 is disposed and mounted as explained with reference to FIG. 3B, the optical coupling component 123 is cut, so that the optical coupling element 103 is disposed at each of the light incidence/emission units of the optical element 102 as described above. Embodiment 2 allows each of the light incidence/emission units of the optical element 102 to be provided with the guide unit 104, forming an introduction port through which an optical fiber is introduced. Incidentally, the optical coupling element may include a plurality of the guide units, the optical element may also include a plurality of the light incidence/emission units, and each of the light incidence/emission units may be disposed correspondingly to each of the guide units.

Embodiment 3

Figure 4A:
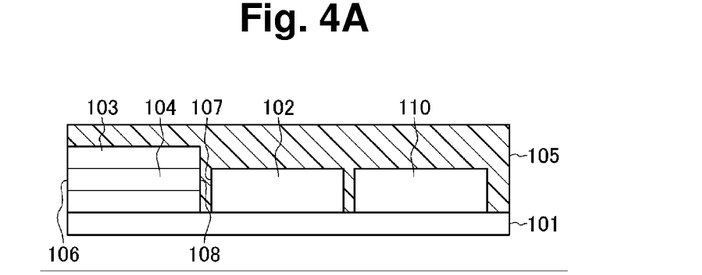
FIG. 4A is a cross-sectional view showing a configuration of an optical component according to Embodiment 3 of the present invention.

Next, an optical component according to Embodiment 3 of the present invention will be explained with reference to FIGS. 4A and 4B. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

In Embodiment 3, an electric element 110 is provided on the substrate 101. The electric element 110 is, for example, a laser diode driver or a modulator driver for driving the optical element 102. Furthermore, the electric element 110 is, for example, a transimpedance amplifier connected to the subsequent stage of a photodiode. The electric element 110 is connected to, for example, a wiring formed on the substrate 101, and is connected to, for example, the optical element 102. Incidentally, similarly to the optical element 102, the electric element 110 may be mounted either face up or face down.

Figure 4B:
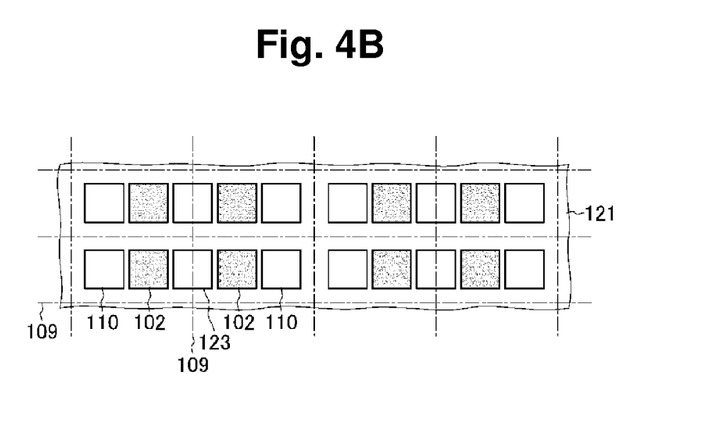
FIG. 4B is a plan view showing a state of an intermediate step for explaining a method for manufacturing the optical component according to Embodiment 3 of the present invention.

In Embodiment 3, for example, as shown in FIG. 4B, two electric elements 110 are disposed on the wafer 121 so as to hold a set of two optical elements 102 therebetween, in which the set of two optical elements 102 is disposed to hold the optical coupling component 123 therebetween, and a plurality of sets of these is provided. Cutting is performed at the cutting line 109 indicated by a dot-dash line disposed individually between the sets and also at a location passing through the center of the optical coupling component 123 perpendicularly to the extension direction of the guide unit 104 of the optical coupling component 123, and thereby the optical component explained with reference to FIG. 4A can be obtained.

Embodiment 4

Figure 5:
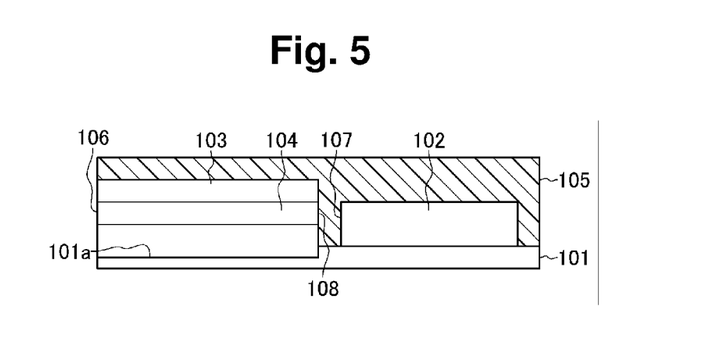
FIG. 5 is a cross-sectional view showing a configuration of an optical component according to Embodiment 4 of the present invention.

Next, an optical component according to Embodiment 4 of the present invention will be explained with reference to FIG. 5. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

In Embodiment 4, there is provided a concave unit (counterbore structure) 101a at a location on the substrate 101 where the optical coupling element 103 is disposed, and a lower portion of this optical coupling element 103 fits the concave unit 101a. The optical coupling element 103 is disposed to fit the concave unit 101a. Provision of the concave unit 101a adjusts a positional relationship between the guide unit 104 of the optical coupling element 103 and the light incidence/emission unit 107 of the optical element 102 in the normal direction of the plane of the substrate 101. Furthermore, the concave unit 101a is provided to fit the optical coupling element 103 into the substrate 101, so that a mounting position of the optical coupling element 103 in the plane direction of the substrate 101 can be easily determined.

Embodiment 5

Figure 6A:
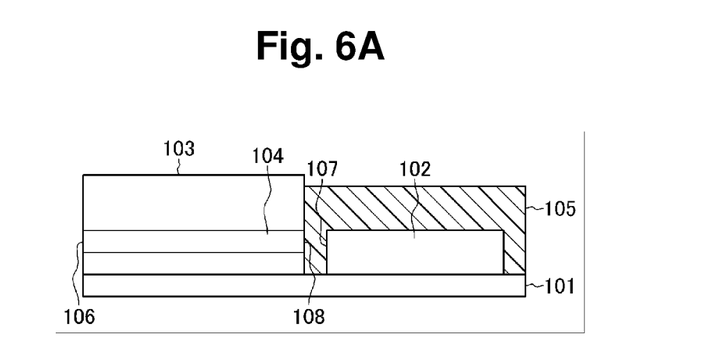
FIG. 6A is a cross-sectional view showing a configuration of an optical component according to Embodiment 5 of the present invention.
Figure 6B:
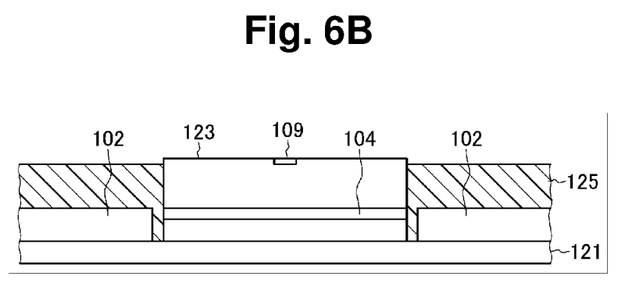
FIG. 6B is a cross-sectional view showing a state of an intermediate step for explaining a method for manufacturing the optical component according to Embodiment 5 of the present invention.

Next, an optical component according to Embodiment 5 of the present invention will be explained with reference to FIGS. 6A and 6B. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 to cover the optical element 102. These are the same as those in Embodiment 1 described above.

In Embodiment 5, a height (thickness) of the optical coupling element 103 in the normal direction of the plane of the substrate 101 is made larger, and an upper portion of the optical coupling element 103 is exposed from the mold resin layer 105. In Embodiment 5, as shown in FIG. 6B, the optical elements 102 are mounted on the wafer 121 so as to hold the optical coupling component 123 therebetween, and the mold resin layer 125 is formed so as to cover the optical element 102 and expose the upper portion of the optical coupling element 103. Furthermore, the cutting line 109 is formed on an upper surface of the optical coupling element 103. In this state, cutting is performed along the cutting line 109 for division, so that the optical component explained with reference to FIG. 6A can be obtained. This can prevent roughness of a cut surface at an interface between the mold resin layer 125 and the optical coupling element 103.

Embodiment 6

Next, an optical component according to Embodiment 6 of the present invention will be explained with reference to FIGS. 1 and 7. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

Figure 7:
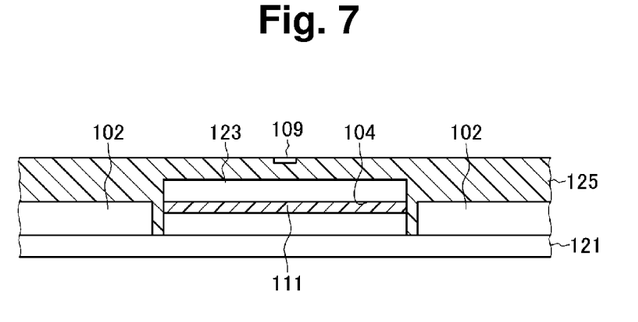
FIG. 7 is a cross-sectional view showing a state of an intermediate step for explaining a method for manufacturing an optical component according to Embodiment 6 of the present invention.

In Embodiment 6, as shown in FIG. 7, the optical coupling component 123 in which the guide unit 104 is filled with a filler 111 made of a predetermined resin is mounted on the wafer 121, the optical elements 102 are mounted on the wafer 121 so as to hold the optical coupling component 123 therebetween, and the mold resin layer 125 is formed to cover the optical coupling component 123 and the optical element 102. In this state, as explained with reference to FIG. 2D, the wafer 121 is cut along the cutting line 109 and divided. Thereafter, the filler 111 filled in the guide unit 104 is, for example, washed with a solvent and thereby removed. This can prevent a fine particle generated during cutting from entering the guide unit 104.

Embodiment 7

Figure 8:
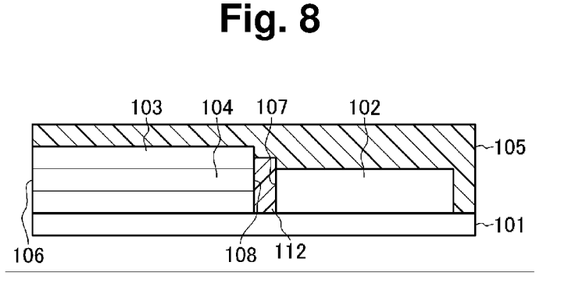
FIG. 8 is a cross-sectional view showing a configuration of an optical component according to Embodiment 7 of the present invention.

Next, an optical component according to Embodiment 7 of the present invention will be explained with reference to FIG. 8. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

In Embodiment 7, there is provided a refractive index matching resin layer 112 disposed so as to fill between the other end 108 of the guide unit 104 and the light incidence/emission unit 107 of the optical element 102. This can reduce optical loss in optical coupling between the optical fiber inserted into the guide unit 104 and the optical element 102. Incidentally, when the refractive index matching resin layer 112 is formed, a resin clearance structure may be used by providing, on the substrate 101 (wafer 121), a notch that prevents resin from flowing into the guide unit 104.

Embodiment 8

Figure 9:
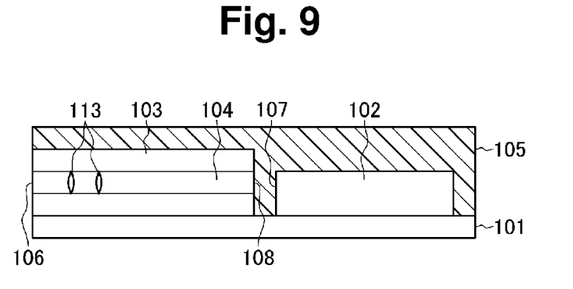
FIG. 9 is a cross-sectional view showing a configuration of an optical component according to Embodiment 8 of the present invention.

Next, an optical component according to Embodiment 8 of the present invention will be explained with reference to FIG. 9. This optical component includes the optical element 102 mounted on the substrate 101 and the optical coupling element 103 mounted on the substrate 101. The optical coupling element 103 includes the guide unit 104 extending in a direction parallel to the plane of the substrate 101 so as to fix an optical fiber. Similarly, in this example, the guide unit 104 is a guide hole into which an optical fiber can be inserted. Furthermore, there is provided the mold resin layer 105 formed on the substrate 101 so as to cover the optical element 102 and expose the side surface of the optical coupling element 103 at the one end 106 of the guide unit 104. These are the same as those in Embodiment 1 described above.

In Embodiment 8, the optical coupling element 103 includes a lens 113 disposed on an axis of the guide unit 104. The lens 113 is, for example, disposed inside the guide unit 104. The lens 113 may be integrally molded with the optical coupling element 103. When the lens 113 is integrally molded with the optical coupling element 103, a machine tool capable of microfabrication may be used. For example, a well-known 3D printer or the like is used, so that the fine lens 113 can be produced inside the guide unit 104 of the optical coupling element 103 at a low cost. Using the lens 113 can increase mounting tolerance of the optical coupling element 103 and the optical element 102, enabling to suppress the optical loss even with mounting position accuracy of the order of several μm.

Embodiment 9

Figure 10:
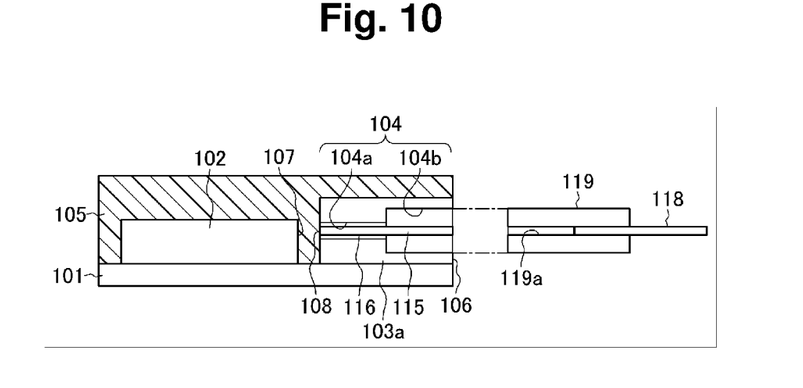
FIG. 10 is a cross-sectional view showing a configuration of an optical component according to Embodiment 9 of the present invention.

Next, an optical component according to Embodiment 9 of the present invention will be explained with reference to FIG. 10. This optical component includes the optical element 102 mounted on the substrate 101 and an optical coupling element 103a mounted on the substrate 101. The optical coupling element 103a includes the guide unit 104 extending in a direction parallel to the plane of the substrate 101 so as to fix an optical fiber. Furthermore, there is provided the mold resin layer 105 formed on the substrate 101 so as to cover the optical element 102 and expose a side surface of the optical coupling element 103a at the one end 106 of the guide unit 104. Except for the optical coupling element 103a, there is no difference from Embodiment 1 described above.

In Embodiment 9, the guide unit 104 of the optical coupling element 103a includes a small diameter portion 104a on the other end 108 side and a large diameter portion 104b on the one end 106 side. The small diameter portion 104a is a guide hole into which an optical fiber can be inserted. The large diameter portion 104b has a larger diameter than the small diameter portion 104a. The large diameter portion 104b constitutes a receptacle connector. Furthermore, there is provided an optical fiber 115 disposed from the small diameter portion 104a to the large diameter portion 104b. The optical fiber 115 is fixed at the small diameter portion 104a by an adhesive layer 116.

For example, an optical fiber 118 to be optically coupled with the optical fiber 115 is inserted into the middle of a guide hole 119a of a plug 119. The plug 119 to which the optical fiber 118 is fixed in this way is inserted into the large diameter portion 104b, the optical fiber 115 is caused to enter the guide hole 119a, and the optical fiber 115 and the optical fiber 118 are caused to abut against each other, bringing the two into a state capable of being optically coupled with each other.

The optical coupling component 123 explained with reference to FIG. 2C is provided with, in addition to a portion serving as the small diameter portion 104a, a cavity portion having a larger diameter and serving as the large diameter portion 104b, and in this state, a center portion of the optical coupling component 123 is cut, so that the optical coupling element 103a including the small diameter portion 104a and the large diameter portion 104b can be obtained. Furthermore, the cavity portion is formed in the optical coupling component 123, and an optical fiber is accommodated so as to extend to the guide unit (small diameter portion 104a) at both ends of the cavity portion and fixed by an adhesive layer, so that a state of including the optical fiber 115 is provided at the time when the optical coupling element 103a is formed by cutting. Furthermore, in this case, an excess optical fiber may be wound around a region of the optical coupling component 123 other than the cutting line of the cavity portion.

Embodiment 10

Figure 11:
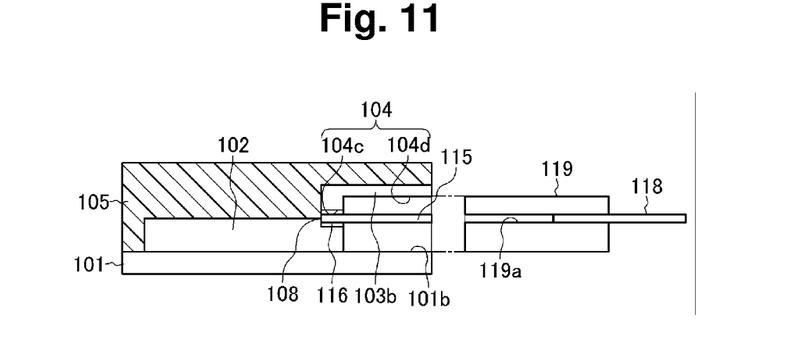
FIG. 11 is a cross-sectional view showing a configuration of an optical component according to Embodiment 10 of the present invention.

Next, an optical component according to Embodiment 10 of the present invention will be explained with reference to FIG. 11. This optical component includes the optical element 102 mounted on the substrate 101 and an optical coupling element 103b mounted on the substrate 101. The optical coupling element 103b includes the guide unit 104 extending in a direction parallel to the plane of the substrate 101 so as to fix an optical fiber. Furthermore, there is provided the mold resin layer 105 formed on the substrate 101 so as to cover the optical element 102 and expose a side surface of the optical coupling element 103b at the one end 106 of the guide unit 104. Except for the substrate 101 and the optical coupling element 103b, there is no difference from Embodiment 1 described above.

In Embodiment 10, the optical coupling element 103b includes a small diameter portion 104c on the other end 108 side and a large diameter portion 104d on the one end 106 side. A portion where the small diameter portion 104c of the guide unit 104 is formed serves as a suppression portion for pressing a partial upper portion of the optical element 102 on the light incidence/emission unit 107 side to the substrate 101 side. Furthermore, the large diameter portion 104d has a larger diameter than the small diameter portion 104a. The large diameter portion 104d also has, for example, a semi-circular shape when viewed in cross section.

Furthermore, a V-groove 101b is formed on the substrate 101 at a portion of the large diameter portion 104d. The large diameter portion 104d and the V-groove 101b constitute a receptacle connector. Furthermore, there is provided the optical fiber 115 disposed from the small diameter portion 104c to the large diameter portion 104d.

The optical fiber 115 is held between the small diameter portion 104c and an upper portion of the optical element 102 and fixed by the adhesive layer 116. The optical element 102 can be optically coupled with the optical fiber 115 at a location where the optical fiber 115 is fixed. A notch structure (V-groove) is formed on the upper portion of the optical element 102 where the optical fiber 115 is disposed, so that disposition accuracy of the optical fiber 115 can be improved.

Similarly, in this example, for example, the optical fiber 118 to be optically coupled with the optical fiber 115 is inserted into the middle of the guide hole 119a of the plug 119. An outer diameter (outer shape) of the plug 119 is adapted to a shape of the receptacle connector formed by the large diameter portion 104d and the V-groove 101b. The plug 119 to which the optical fiber 118 is fixed in this way is inserted into the receptacle connector formed by the large diameter portion 104d and the V-groove 101b, the optical fiber 115 is caused to enter the guide hole 119a, and the optical fiber 115 and the optical fiber 118 are caused to abut against each other, bringing the two into a state capable of being optically coupled with each other.

As explained above, according to the present invention, the other end of the guide unit and the light incidence/emission unit of the optical element are disposed to face each other, and the mold resin layer is formed so as to cover the optical element and expose the side surface of the optical coupling element at the one end of the guide unit. Therefore, a mounting form of an optical component for OBO by means of WLP can achieve highly accurate optical coupling with an optical fiber without an increase in the mounting cost.

It should be noted that the present invention is not limited to the embodiments explained above, and needless to say, many variations and combinations can be made by those with ordinary skill in the art within the technical idea of the present invention.

REFERENCE SIGNS LIST

101 Substrate
102 Optical element
103 Optical coupling element
104 Guide unit
105 Mold resin layer
106 One end
107 Light incidence/emission unit
108 Other end.

The invention claimed is:

1. An optical component comprising:
an optical element mounted on a top surface of a substrate, the optical element comprising a light incidence/emission device on a side surface of the optical element, the side surface being perpendicular to the top surface of the substrate;
an optical coupler mounted on the top surface of the substrate, the optical coupler comprising a guide extending in a direction parallel to the top surface of the substrate so as to fix an optical fiber in the guide, the optical fiber overlapping the top surface of the substrate; and
a mold resin layer on the top surface of the substrate and covering a top surface of the optical element, wherein the mold resin layer exposes a side surface of the optical coupler at a first end of the guide, and wherein a second end of the guide faces the light incidence/emission device of the optical element.

2. The optical component according to claim 1, wherein:
the optical element comprises a plurality of light incidence/emission devices; and
a plurality of optical couplers is provided, wherein each of the plurality of light incidence/emission devices corresponds to a respective one of the plurality of optical couplers.

3. The optical component according to claim 1, further comprising:

a concave structure at a location on the substrate where the optical coupler is disposed, the optical coupler fitting and within the concave structure.

4. The optical component according to claim 1, comprising a refractive index matching resin disposed filling a space between the second end of the guide and the light incidence/emission device of the optical element.

5. The optical component according to claim 1, wherein:
the optical coupler comprises a plurality of guides;
the optical element comprises a plurality of light incidence/emission devices; and
the plurality of light incidence/emission devices is disposed to have a one-to-one correspondence with the plurality of guides.

6. The optical component according to claim 1,
wherein the optical coupler comprises a lens disposed on an axis of the guide.

7. The optical component according to claim 1,
wherein the guide of the optical coupler comprises a small diameter portion on the second end side and a large diameter portion on the first end side, the large diameter portion having a larger diameter than the small diameter portion, and the optical component further comprises an optical fiber extending from the small diameter portion to the large diameter portion.

8. A method for manufacturing an optical component, the method comprising:
mounting an optical coupler on a substrate, the optical coupler comprising a guide, the guide extending in a direction parallel to a plane of the substrate so as to fix an optical fiber;
mounting a first optical element on the substrate so that an open end of the guide faces a first light incidence/emission device of the first optical element, wherein the first light incidence/emission device is on a side surface perpendicular to the plane of the substrate;
forming a mold resin layer covering the optical component; and
cutting the optical coupler and the substrate along a cutting line perpendicular to an extension direction of the guide thereby dividing the optical coupler into a first optical coupler and a second optical coupler.

9. The method of claim 8, further comprising:
mounting a second optical element on the substrate so that the open end of the guide faces a second light incidence/emission device of the second optical element, wherein the second light incidence/emission device is on the side surface perpendicular to the plane of the substrate.

10. The method of claim 8, wherein:
the first optical element comprises a plurality of first light incidence/emission devices; and
a plurality of optical couplers is provided, wherein each of the plurality of first light incidence/emission devices corresponds to a respective one of the plurality of optical couplers.

11. The method of claim 8 further comprising:
disposing a concave structure at a location on the substrate where the first optical coupler is disposed, the first optical coupler fitting and within the concave structure.

* * * * *